(12) United States Patent
Blacken et al.

(10) Patent No.: US 10,808,868 B2
(45) Date of Patent: Oct. 20, 2020

(54) APPARATUS TO ASSEMBLE CABLE MOUNTS

(71) Applicant: The Boeing Company, Chicago, IL (US)

(72) Inventors: Lars E. Blacken, Bothell, WA (US); Randy Fraker, Everett, WA (US); Keith Cutler, Kirkland, WA (US); John R. Porter, Edgewood, WA (US); Damien O. Martin, Everett, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/842,627

(22) Filed: Dec. 14, 2017

(65) Prior Publication Data

US 2019/0186654 A1     Jun. 20, 2019

(51) Int. Cl.
*F16L 3/12*     (2006.01)
*B64D 33/00*     (2006.01)

(52) U.S. Cl.
CPC ............ *F16L 3/12* (2013.01); *B64D 33/00* (2013.01)

(58) Field of Classification Search
CPC .................................... F16L 3/12; H02G 3/00
See application file for complete search history.

(56) References Cited

U.S. PATENT DOCUMENTS

| | | | |
|---|---|---|---|
| 3,204,776 A | 9/1965 | Brown et al. | |
| 3,839,777 A * | 10/1974 | Puzio | F16L 3/22 269/55 |
| 4,029,277 A * | 6/1977 | Bulanda | F16G 11/103 248/74.1 |
| 4,264,047 A * | 4/1981 | Nelson | F16L 3/12 24/339 |
| 4,337,934 A | 7/1982 | Caveney | |
| 4,566,502 A | 1/1986 | Kellogg | |
| 4,616,797 A * | 10/1986 | Cramer | F16B 2/12 24/514 |
| 5,326,059 A * | 7/1994 | Pryor | F16M 11/08 248/230.6 |
| 5,694,678 A | 12/1997 | Karasik | |
| 6,439,522 B1 * | 8/2002 | Yeh | A47B 96/061 248/228.6 |
| 8,196,882 B2 * | 6/2012 | Antus, Jr. | A45B 3/00 135/16 |

(Continued)

OTHER PUBLICATIONS

Amazon, "Triton Products 72455 MagClip 1-¾-Inch Black Magnetic Mag Mount Tool Holder, 5-pack," retrieved online at [https://www.amazon.com/Triton-Products-72455-MagClip-Magnetic/dp/B0019G2GpQ], retrieved on May 29, 2018, 6 pages.

(Continued)

*Primary Examiner* — Anita M King
(74) *Attorney, Agent, or Firm* — Hanley, Flight & Zimmerman, LLC

(57) ABSTRACT

Methods and apparatus to assemble cable mounts are disclosed. A disclosed example mount to be inserted into a formboard includes a spine, first and second opposing clamp surfaces on first and second ends, respectively, of the spine, and a pocket to receive a fastener, the fastener to be disposed between the first and second opposing clamp surfaces, the fastener to have a contractible engaging portion to be received by the formboard.

25 Claims, 7 Drawing Sheets

(56) References Cited

U.S. PATENT DOCUMENTS 8,704,623 B2 * 4/2014 Dumonski ....... H01B 13/01227
  335/285
10,256,011 B2 * 4/2019 Rouleau ........... H01B 13/01209

OTHER PUBLICATIONS

Panduit, "Harness Board Accessories," Products & Services, retrieved online at [http://www1.panduit.com/en/products-and-services/products/cable-and-wire-bundling/harnessboard-accessories], retrieved on May 29, 2018, 2 pages.

* cited by examiner

APPARATUS TO ASSEMBLE CABLE MOUNTS

FIELD OF THE DISCLOSURE

This disclosure relates generally to assembly and, more particularly, to methods and apparatus to assemble cable mounts.

BACKGROUND

To organize multiple cable assemblies with having relatively large diameters and/or high rigidity, stands or mounts are placed at designated positions of a formboard to facilitate routing and placement of the cable assemblies. The stands or mounts usually extend from a surface or plane of the board and include an opening/eyelet portion that supports and retains a portion of a cable assembly to route and/or restrain the cable assembly.

Some known cable assembly mounting stands are assembled in an automated process that utilizes sensors, retroreflectors, etc. However, these known assembly systems can be complex and expensive. Further, these known assembly systems can necessitate placement of the mounting stands away from components or fixtures for proper operation. Some known mounting stands that are self-aligning (e.g., do not require alignment), such as magnetic stands do not have sufficient strength to properly secure larger cable/wire bundles in place.

SUMMARY

An example mount to be removably coupled to a formboard includes a spine, first and second opposing clamp surfaces on first and second ends, respectively, of the spine, and a pocket to receive a fastener, the fastener to be disposed between the first and second opposing clamp surfaces, the fastener to have a contractible engaging portion to be received by the formboard.

An example assembler to couple and uncouple a mount relative to a formboard includes a base, opposed first and second fingers coupled to the base, and an actuator to move the first and second fingers relative to one another to cause contraction of a contractible engaging portion of a fastener that is held between first and second clamping surfaces of the mount.

An example method of assembling a mount to a formboard includes moving first and second fingers of an assembler between a fastener and a clamping surface of the mount to couple the mount to the assembler, moving the assembler towards an aperture of the formboard, and moving the first and second fingers relative to one another to cause a contractible engaging portion of the fastener to decompress into the aperture to couple the mount to the formboard.

Figure 1:
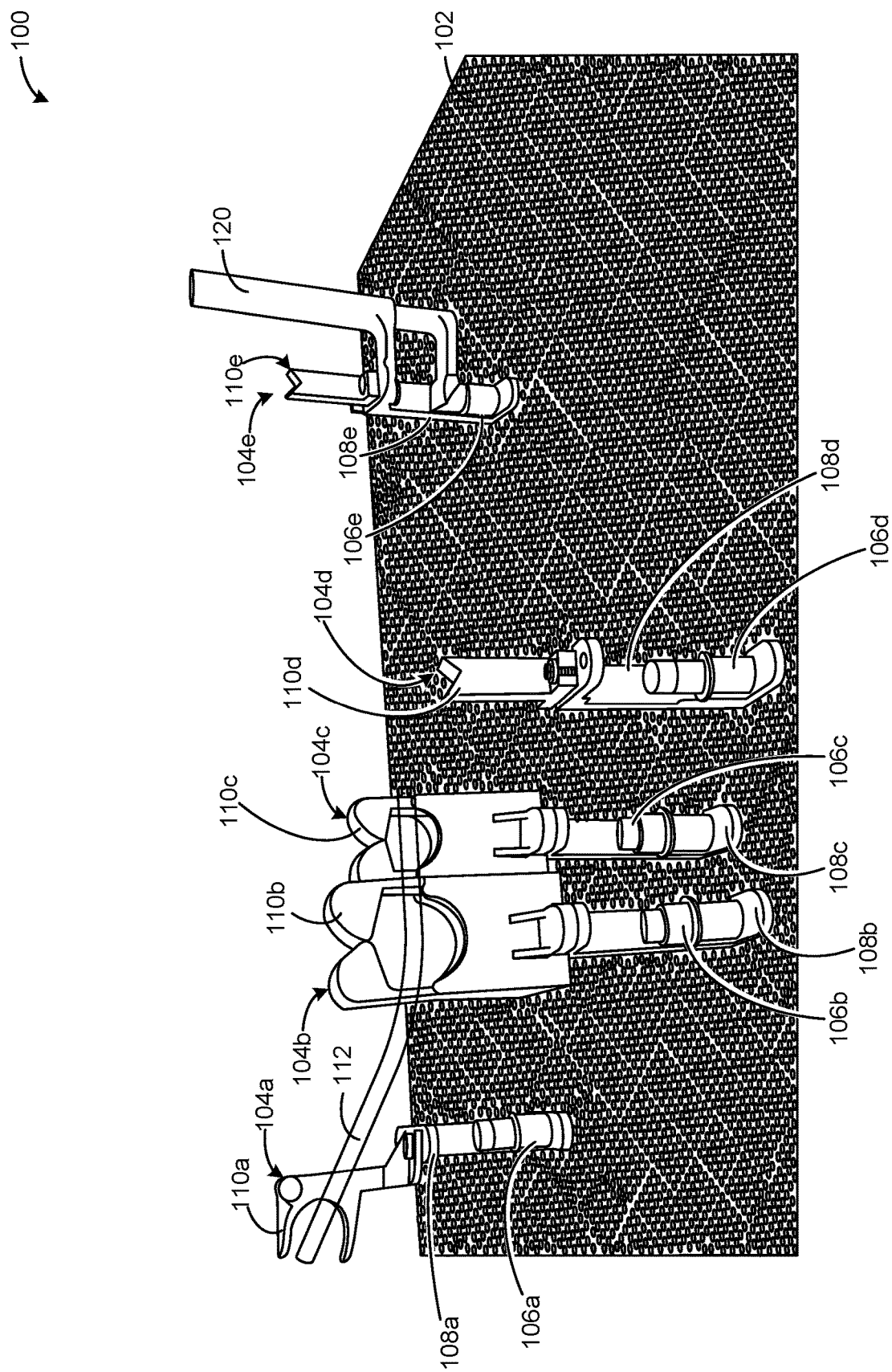
FIG. 1 depicts an example wire routing assembly in accordance with the teachings of this disclosure.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to assemble cable mounts are disclosed. Cable/wire mounts are assembled to surfaces, edges or other geometric features of formboards to facilitate retention and routing of cable assemblies. Some known cable mounts are assembled to a surface using complex automated assembly systems that can be costly to implement. Further, some known self-aligning cable mounts can be susceptible to unintended removal or separation when relatively larger (e.g., larger diameter, low flexibility, etc.) cable assemblies and/or a significant number of cable assemblies are being retained.

The examples disclosed herein provide a cost-effective and highly secure removable mounting/coupling of cable mounts to a formboard (e.g., an opening pattern board, a mounting board, a mounting array, etc.). In particular, the examples disclosed herein implement a mount including a support bracket or body with opposing clamping surfaces to secure a contractible fastener. Further, the support bracket is coupled to and/or integral with a wire routing portion/component or guide (e.g., a cable routing opening, a cable routing eyelet, etc.). An engaging portion (e.g., an compressible engaging portion, an expandable engaging portion, etc.) of the contractible fastener is contracted by use of a mounting apparatus or assembler that includes opposed fingers that compress a portion of the contractible fastener against at least one of the opposed clamping surfaces. Further, some of the examples disclosed herein enable highly customizable cable management by allowing the attachment of different routing portions to the support bracket.

In some examples, the cable mount is generally c-shaped. Additionally or alternatively, the cable mount includes a magnet to align the contractible fastener to the support bracket and/or to align the mount to a designated location on the formboard. In some examples, cable mounts with contractible fasteners are dispensed via a dispenser, which is based on fluid pressure or vibrations, for example.

As used herein, the terms "mount" and "cable mount" refer to a guiding feature, component and/or assembly that is used to align, mount and/or constrain another component, such as a cable, for example. As used herein, the term "contractible fastener" refers to a fastener that is coupled to another object by contraction of a portion of the fastener. As used herein, the term "formboard" refers to a plate, surface and/or component that has an array of features, such as apertures or openings, etc.

FIG. 1 depicts an example wire routing assembly 100 in accordance with the teachings of this disclosure. The wire routing assembly 100 of the illustrated example includes a perforated formboard (e.g., an opening array board, an assembly board, etc.) 102, and movable mounts (e.g., mount assemblies, stands, routing harnesses, etc.) 104 (hereinafter 104a, 104b, 104c, 104d, 104e, etc.) that are placed or assembled onto the formboard 102.

Each of the example movable mounts 104 includes contractible (e.g., compressible) connectors or fasteners 106 (hereinafter 106a, 106b, 106c, 106d, 106e, etc.) assembled thereto, as well as a support body 108 (hereinafter 108a, 108b, 108c, 108d, 108e, etc.) in which the fasteners 106 are disposed. In this example, each of the support bodies 108 positions and/or aligns guides (e.g., cable guides, harness guides, eyelets, etc.) 110 (hereinafter 110a, 110b, 110c, 110d, 110e, etc.). As can be seen in the illustrated example of FIG. 1, at least some of the guides 110 support, restrain and route cables (e.g., cable bundles, wire bundles, etc.) 112.

As can be seen in FIG. 1, a mount assembler 120 is shown placing the movable mount 104e onto the formboard 102. As will be discussed in greater detail below in connection with FIGS. 2-8, the assembler 120 utilizes a geometry of the support bodies 108 to decompress the fasteners 106 so that the fasteners 106 can be coupled to and released from openings or apertures of the formboard 102.

To facilitate routing and restraint of the cables 112, the movable mounts 104 are arranged at defined locations of the formboard 102. In particular, the movable mounts 104 are positioned on respective apertures or holes of the formboard 102 to define a cable routing path.

Figure 2:
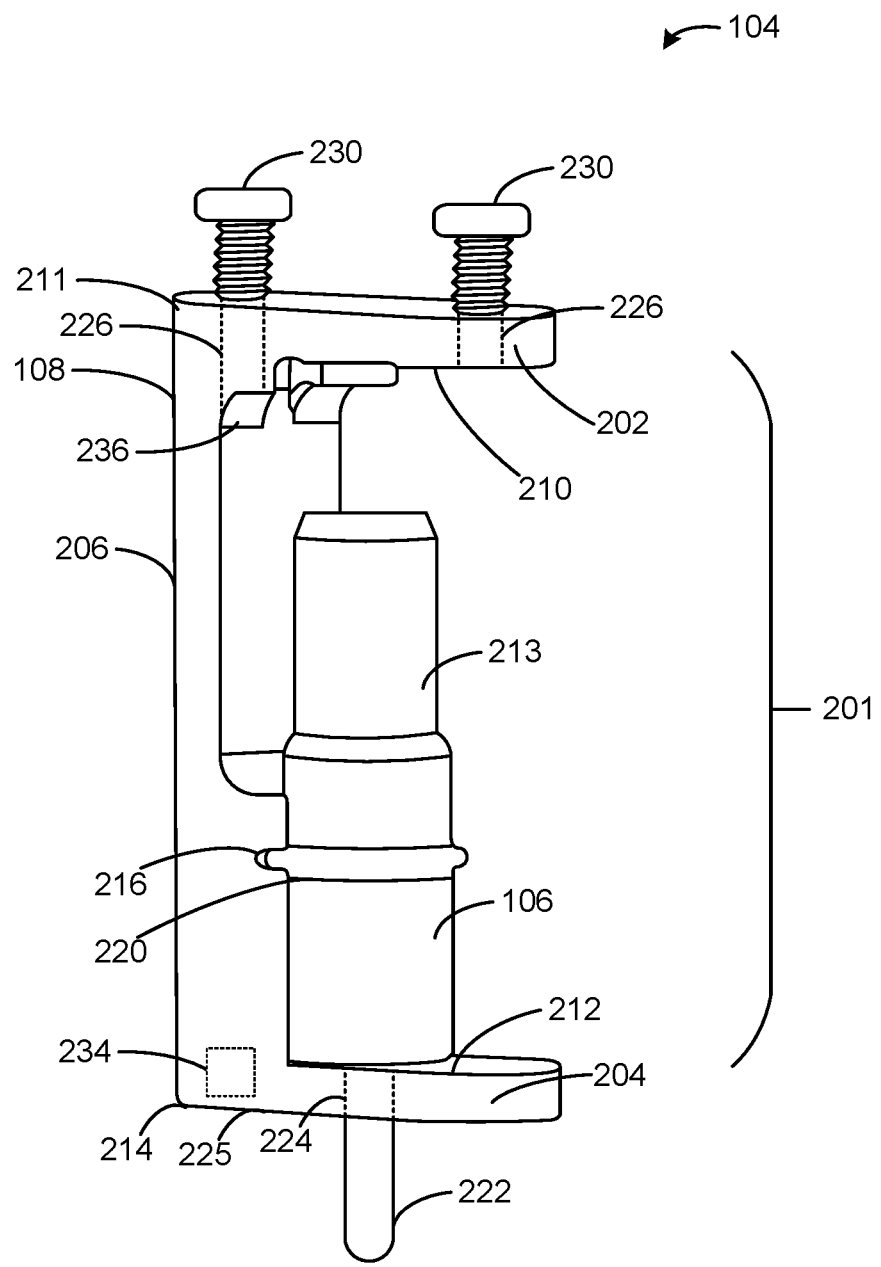
FIG. 2 is a detailed view of an example mount of FIG. 1 with a compressible fastener assembled therein.

FIG. 2 is a detailed view of the example mount 104 of FIG. 1 shown positioning, guiding and/or holding the contractible fastener 106. According to the illustrated example of FIG. 2, the fastener 106 is shown coupled to the support body 108 in a deployed locking position. In particular, FIG. 2 illustrates a default position of the fastener 106 that corresponds to coupling to another component and/or feature.

To enable access to the fastener 106 by the assembler 120, the support body 108 of the illustrated example includes a pocket 201 defined by a first upper flange or clamp 202, as well as a second bottom flange or clamp 204, both of which are coupled to a spine 206. Accordingly, the first flange 202 defines a first clamping surface 210 on a first end 211 of the spine 206 while the second flange 204 defines a second clamping surface 212 on a second end 214 of the spine 206. In this example, a plunger 213 of the fastener 106 generally extends towards the clamping surface 210. In other words, the spine 206 in combination with the first and second flanges 202, 204 define the aforementioned pocket 201 of the support body 108 with opposing first and second clamping surfaces 210, 212.

To retain the fastener 106 within the support body 108, the spine 206 of the support body 108 includes an alignment feature, which is implemented as an annular groove 216 in this example. The example annular groove 216 retains an annular protrusion or ring 220 of the fastener 106. Further, a contractible portion 222 of the fastener 106 is retained in an aperture 224 of the second flange 204 in this example. In other words, the example contractible portion 222 extends outwardly away from an external surface 225 of the support body 108.

To mount the guide 110 to the support body 108, the first flange 202 of the support body 108 includes threaded apertures 226 to retain fasteners (e.g., screws, clips, etc.) 230. In particular, implementation of the threaded apertures 226 enables a wide variety of different guides 110 to be used for specific applications (e.g., based on specific cable type, cabling sizes, cable management applications, etc.). As a result, the example support body 108 enables modularity of different supports to allow greater design flexibility.

In some examples, the support body 108 includes and/or is coupled to a magnet 234. In such examples, the magnet 234 may be used to retain, constrain and/or align the fastener 106. Additionally or alternatively, the magnet 234 is used to position the support body 108 and/or the movable mount 104 at a location (e.g., an aperture location) of the formboard 102. In particular, the magnet 234 can guide the mount 104 to an aperture or opening of the formboard 102 based on a position of another magnet proximate the formboard 102, for example. In some examples, the support body 108 includes rounds or fillets 236 to further strengthen the support body 108. In some examples, the fastener is implemented as a CLECO® fastener.

While the example support body 108 is shown being having a generally c-shaped structure, the support body 108 may include any appropriate geometry and/or shape. While the fastener 106 is shown utilizing the plunger 213, the fastener 106 may employ any appropriate actuation/mechanism to be locked into the formboard 102. While the fastener 106 of the illustrated example is a contractible fastener, the fastener 106 can be implemented instead as an expandable fastener. In some examples, the fastener 106 is implemented as a screw, a river, a press-fit pin, etc.

Figure 3:
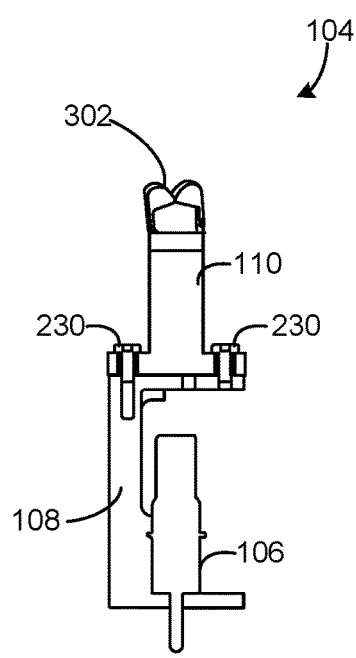
FIG. 3 is a cross-sectional view of the example mount of FIGS. 1 and 2.

FIG. 3 is a cross-sectional view of the example mount 104 of FIGS. 1 and 2. In this example, the mount 104 is shown in a locked state. According to the illustrated example of FIG. 3, the guide 110 is shown coupled to the support body 108 via the fasteners 230. In this particular example, the guide 110 is generally axially aligned with the fastener 106. In some examples, at least some of the guides 110 resemble an eyelet shape. Additionally or alternatively, at least some of the guides 110 include movable, rotatable and/or spring-loaded tabs 302 to grasp or retain the cable 112.

Figure 4:
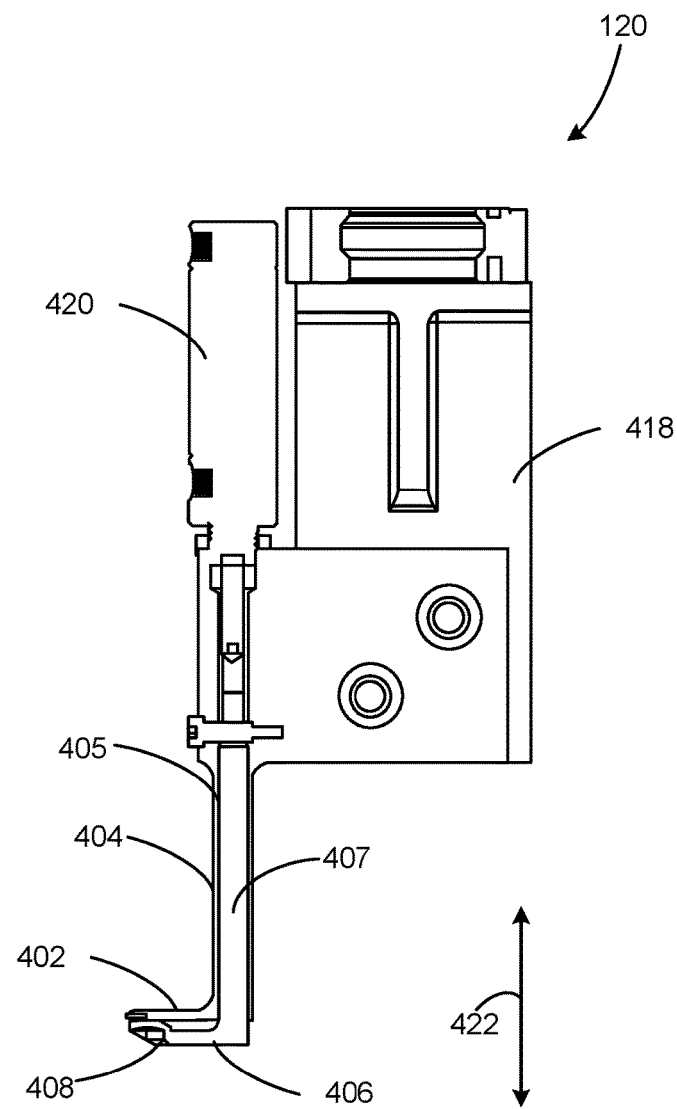
FIG. 4 is a cross-sectional view of an example assembler of FIG. 1.

FIG. 4 is a cross-sectional view of the example assembler 120 of FIG. 1. The assembler 120 of the illustrated example includes a first finger 402 having a corresponding stem 404 with an aperture 405 therethrough. The example assembler 120 also includes a second finger 406 having a corresponding stem 407, as well as a beveled or chamfered edge 408. In this example, the first and second fingers 402, 406 are opposed to one another. Further, the assembler 120 includes a movable body 418 and an actuator (e.g., a pneumatic actuator) or movement device 420.

To displace the second finger 406 relative to the first finger 402, the actuator 420 causes movement of the stem 407 along a direction generally indicated by a double arrow 422. In particular, the stem 407 of the illustrated example is displaced by the actuator 420 to move relative to the stem 404 within the aperture 405. In this example, the first finger 402 remains stationary during movement of the second finger 406. However, both of the first and second fingers 402, 406 may be simultaneously displaced in other examples.

Figure 5:
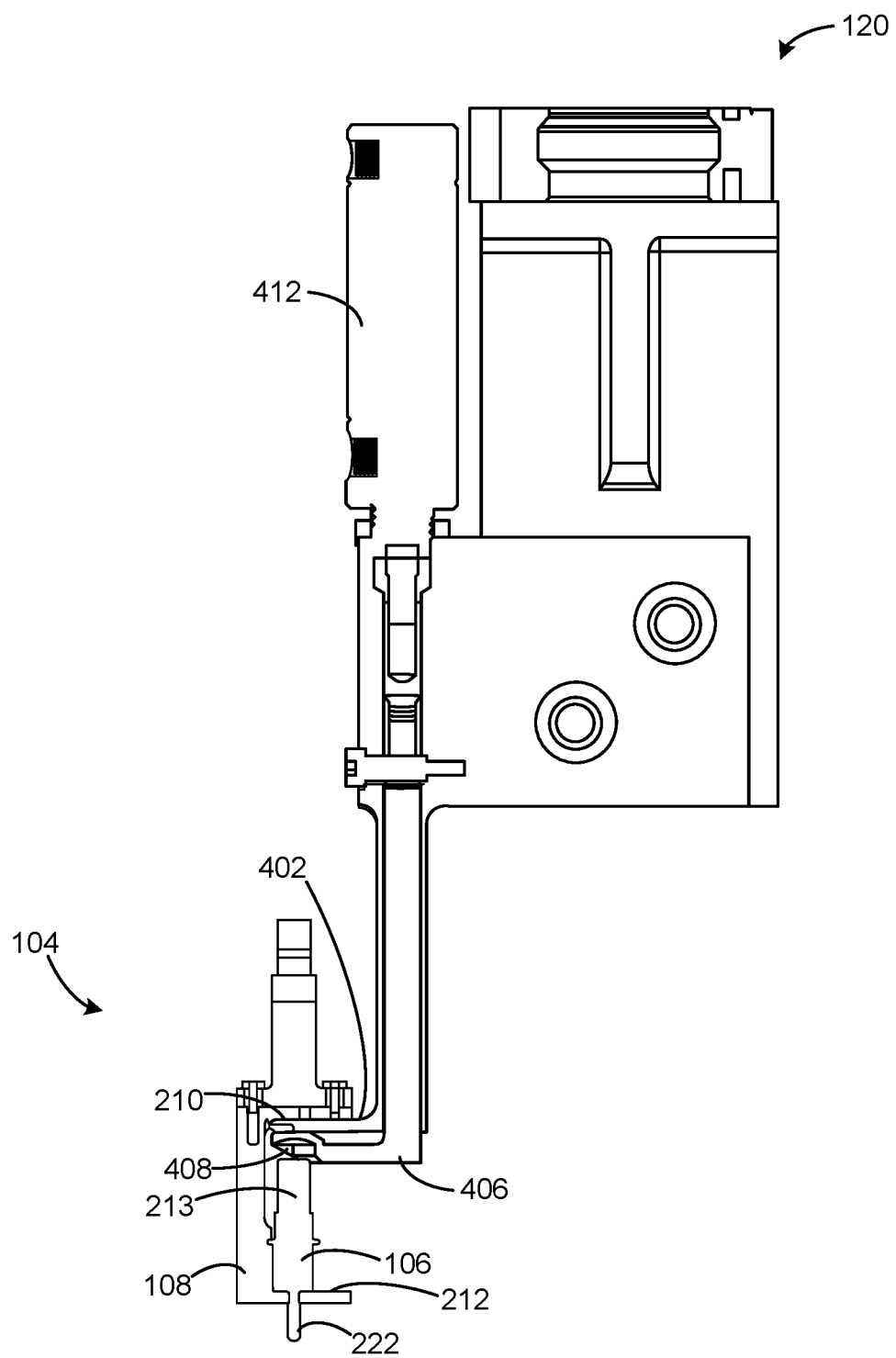
FIG. 5 is a cross-sectional view depicting the example assembler shown in FIGS. 1 and 4 engaging the example mount of FIGS. 1-3.

FIG. 5 is a cross-sectional view depicting the example assembler 120 of FIGS. 1 and 4 engaging the example mount 104 shown in FIGS. 1-3. As can be seen in the illustrated example of FIG. 5, the assembler 120 has been moved to cause the first and second fingers 402, 406 to be disposed between the clamping surfaces 210, 212, as well as above (e.g., directly above) the fastener 106. In this example, the chamfered edge 408 facilitates contact of the second finger 406 to the plunger 213 of the fastener 106 as the first and second fingers 402, 406 move towards the mount 104. Additionally or alternatively, the chamfered edge 408 facilitates insertion of the first and second fingers 402, 406 within the body 108.

According to the illustrated example, downward movement of the second finger 406 moves the plunger 213 and causes the engaging portion 222 to contract, thereby enabling either insertion or removal of the mount 104 relative to the formboard 102. In particular, a diameter of the engaging portion 222 contracts when the plunger 213 is compressed, thereby allowing the engaging portion 222 to be held or constrained by an aperture of the formboard 102. Conversely, the engaging portion 222 decompresses to its default state when the plunger 213 is not compressed. In other words, movement of the plunger 213 causes the mount to be removably coupled to the aperture of the formboard 102.

In other examples, upward movement (in the view of FIG. 5) of the plunger 213 causes contraction of the diameter of the engaging portion 222 instead of downward movement. In some examples, the actuator 412 moves both of the first and second fingers 402, 406 to facilitate movement into the body 108. In some examples, a length of the engaging portion 222 is varied by movement of the plunger 213.

Figure 6:
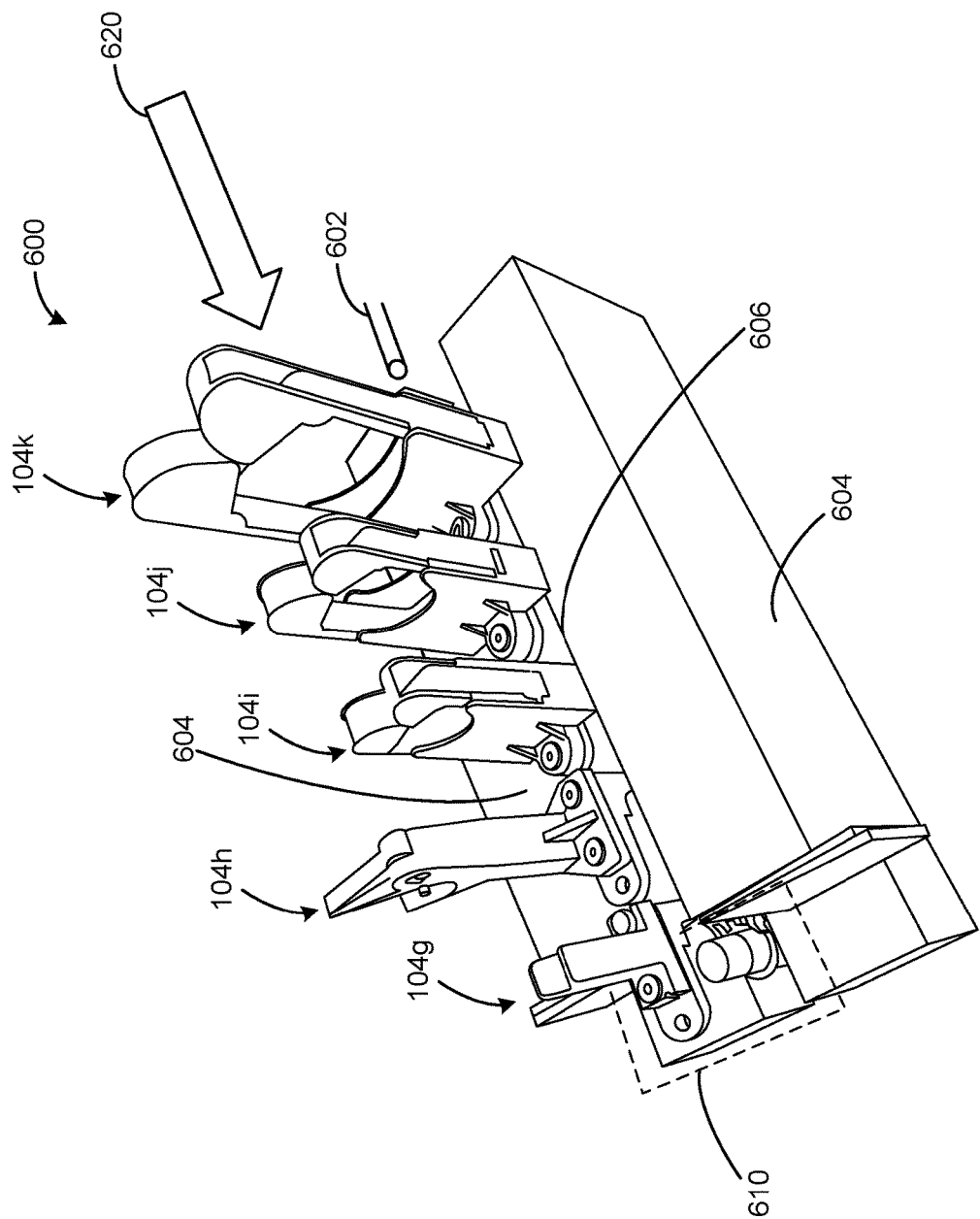
FIG. 6 depicts an example mount dispenser that may implemented with the examples disclosed herein.

FIG. 6 depicts an example mount dispenser 600 that may be implemented with the examples disclosed herein. According to the illustrated example, the dispenser 600 is implemented as a fluid pressure operated dispenser and includes a fluid pressure source (e.g., an air pressure source) 602, and alignment blocks 604 that define a channel 606. In the illustrated view of FIG. 6, the mounts 104 (hereinafter 104g, 104h, 104i, 104j and 104k in this example) are shown being dispensed in order to a transfer area 610, in which the assembler 120 is to pick up the mounts 104.

To dispense the mounts 104 to the transfer area 610, the fluid pressure source 602 provides fluid that moves the mounts 104 in an ordered sequence towards the transfer area 610 in a direction generally indicated by an arrow 620 so that the assembler 120 can readily access the mounts 104 for assembly to the formboard 102. In some examples, the fluid pressure source 602 provides fluid with repeated pulse and/or pulse patterns to facilitate movement and/or acceleration of the mounts 104.

Figure 7:
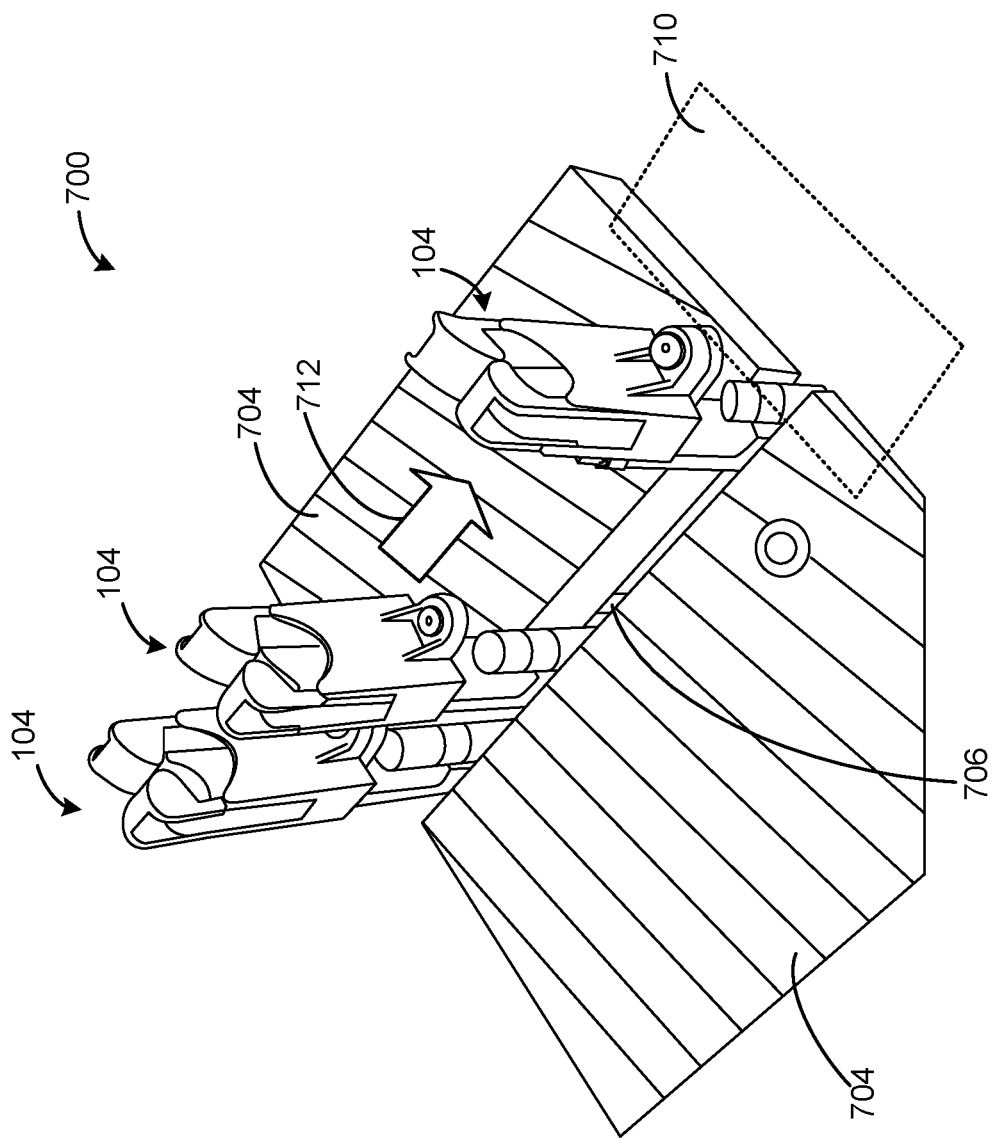
FIG. 7 depicts another example mount dispenser that may be implemented with the examples disclosed herein.

FIG. 7 depicts another example mount dispenser 700 that may be implemented with the examples disclosed herein. In contrast to the mount dispenser 600 of FIG. 6, the mount dispenser 700 is vibration operated to move the mounts 104 instead of fluid pressure and, thus, is implemented as a vibrational dispenser. The example mount dispenser 700 includes blocks 704 that define a channel 706. Accordingly, an inclined surface or portion of the blocks 704 enables movement of the mounts 104 by gravity towards a receiving area 710 in a direction generally indicated by an arrow 712 so that the assembler 120 can grasp/receive one of the mounts 104.

Figure 8:
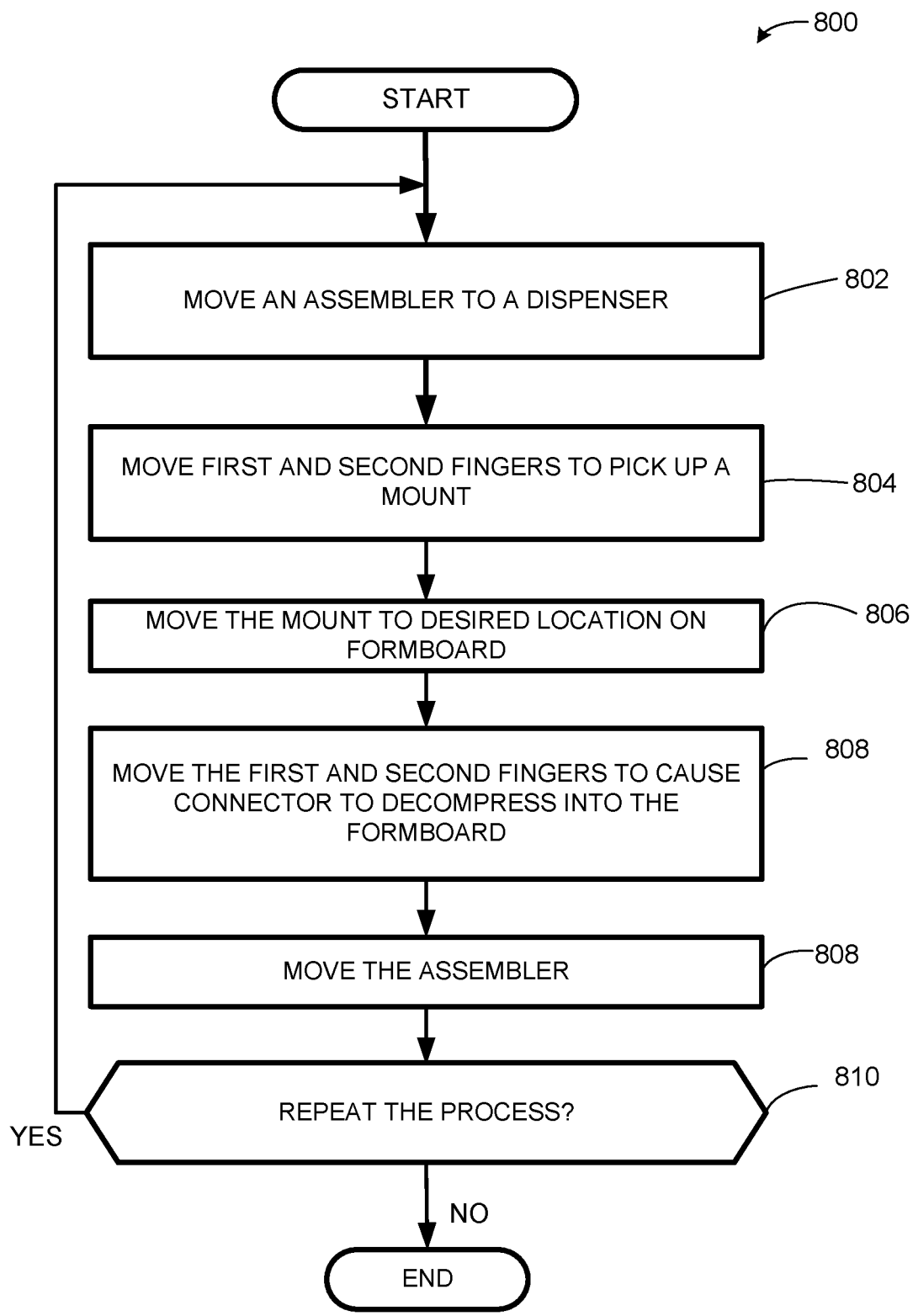
FIG. 8 is a flowchart representative of an example method to implement the examples disclosed herein.

FIG. 8 is a flowchart representative of an example method 800 to implement the examples disclosed herein. The example method 800 begins as one of the mounts 104 is ready to be assembled onto the formboard 102. In this example, multiple mounts 104 are being assembled to the formboard 102 to route multiple cable assembles 112.

In this example, the assembler 120 is moved to a mount dispenser, such as the mount dispenser 600 or the mount dispenser 700 (block 802). In particular, the assembler 120 is actuated towards the aforementioned dispenser with the opposed first and second fingers 402, 406 moved towards one another.

According to the illustrated example, the first and second fingers 402, 406 are moved to pick up the mount 104 (block 804). In this example, the fingers 402, 406 are moved apart relative to one another so that the first finger 402 contacts the upper clamping surface 210 while the second finger 406 least partially compresses the plunger 213 to pick up the mount 104 and contract an outer diameter of the engaging portion 222 to facilitate placement of the mount 104 into a hole of the formboard 102.

In this example, the assembler 120 moves the mount 104 to a desired location of the formboard 102 (block 806). In this example, the assembler 120 moves the mount 104 to a designated specific opening of the formboard 102. The designated opening can be based on a planned cable routing scheme, for example.

Next, the assembler 120 then causes the first and second fingers 402, 406 to move closer to one another, thereby causing the engaging portion 222 of the fastener 106 to decompress and, thus, couple the mount 104 to the formboard 102 (block 808).

Additionally or alternatively, in some examples, the assembler 120 is used to remove the mount 104 from the formboard 102 (block 809). In such examples, the assembler 120 can re-position the mount 104 to accommodate a new cable routing configuration.

It is then determined whether to repeat the process or not (block 810). If the process is to be repeated (block 810), control of the process returns to block 802. Otherwise, the process ends. This determination may be based on whether additional ones of the mounts 104 are to be mounted to the formboard 102.

From the foregoing, it will be appreciated that example methods, apparatus and articles of manufacture have been disclosed that enable cost-effective assembly of mounts to formboards. The examples disclosed also enable robust attachment of the mounts by utilizing clamping surfaces with an assembler.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are shown in relationship to coupling wire/cable mounds to a formboard, the examples disclosed herein may be applied to any appropriate application in which mounts/stands are arranged to position components relative to one another.

What is claimed is:

1. A mount to be removably coupled to a formboard, the mount comprising:
    a spine;
    first and second opposing clamp surfaces on first and second ends, respectively, of the spine;
    a pocket to receive a fastener, the fastener to be disposed between the first and second opposing clamp surfaces, the fastener to have a contractible engaging portion to be received by the formboard; and
    a guide including an eyelet to hold at least a portion of a cable.

2. The mount as defined in claim 1, further including a magnet to align the fastener to the mount.

3. The mount as defined in claim 1, further including a magnet to position the mount relative to an aperture of the formboard.

4. The mount as defined in claim 1, further including an aperture to receive the contractible engaging portion.

5. The mount as defined in claim 1, further including a groove to retain an annular protrusion of the fastener.

6. The mount as defined in claim 1, wherein the mount is generally c-shaped.

7. A mount to be removably coupled to a formboard, the mount comprising:
   a spine;
   first and second opposing clamp surfaces on first and second ends, respectively, of the spine;
   a pocket to receive a fastener, the fastener to be disposed between the first and second opposing clamp surfaces, the fastener to have a contractible engaging portion to be received by the formboard; and
   a magnet to align the fastener to the mount.

8. The mount as defined in claim 7, further including a guide to attach to the mount, the guide to hold a cable.

9. The mount as defined in claim 8, wherein the guide includes an eyelet.

10. The mount as defined in claim 7, further including an aperture to receive the contractible engaging portion.

11. The mount as defined in claim 7, further including a groove to retain an annular protrusion of the fastener.

12. The mount as defined in claim 7, wherein the mount is generally c-shaped.

13. A mount to be removably coupled to a formboard, the mount comprising:
   a spine;
   first and second opposing clamp surfaces on first and second ends, respectively, of the spine;
   a pocket to receive a fastener, the fastener to be disposed between the first and second opposing clamp surfaces, the fastener to have a contractible engaging portion to be received by the formboard; and
   a magnet to position the mount relative to an aperture of the formboard.

14. The mount as defined in claim 13, further including a guide to attach to the mount, the guide to hold a cable.

15. The mount as defined in claim 14, wherein the guide includes an eyelet.

16. The mount as defined in claim 13, further including an aperture to receive the contractible engaging portion.

17. The mount as defined in claim 13, further including a groove to retain an annular protrusion of the fastener.

18. The mount as defined in claim 13, wherein the mount is generally c-shaped.

19. A mount to be removably coupled to a formboard, the mount comprising:
   a spine;
   first and second opposing clamp surfaces on first and second ends, respectively, of the spine;
   a pocket to receive a fastener, the fastener to be disposed between the first and second opposing clamp surfaces, the fastener to have a contractible engaging portion to be received by the formboard; and
   a groove to retain an annular protrusion of the fastener.

20. The mount as defined in claim 19, further including a guide to attach to the mount, the guide to hold a cable.

21. The mount as defined in claim 20, wherein the guide includes an eyelet.

22. The mount as defined in claim 19, further including a magnet to align the fastener to the mount.

23. The mount as defined in claim 19, further including a magnet to position the mount relative to an aperture of the formboard.

24. The mount as defined in claim 19, further including an aperture to receive the contractible engaging portion.

25. The mount as defined in claim 19, wherein the mount is generally c-shaped.

\* \* \* \* \*